(12) United States Patent
Simic-Glavaski et al.

(10) Patent No.: US 6,828,527 B2
(45) Date of Patent: Dec. 7, 2004

(54) ELECTRON SOURCE FOR FOOD TREATING APPARATUS AND METHOD

(76) Inventors: Branimir Simic-Glavaski, 2481 Edgehill Rd., Cleveland, OH (US) 44106; Michael G. Simic, 9404 Bac Pl., Gaithersburg, MD (US) 20877

( * ) Notice: Subject to any disclaimer, the term of this patent is extended or adjusted under 35 U.S.C. 154(b) by 0 days.

(21) Appl. No.: 10/379,262

(22) Filed: Mar. 4, 2003

(65) Prior Publication Data

US 2003/0155346 A1 Aug. 21, 2003

Related U.S. Application Data

(63) Continuation-in-part of application No. 10/014,631, filed on Oct. 26, 2001, now Pat. No. 6,528,768.

(51) Int. Cl.[7] .............................. A23L 1/25; A23L 3/32; H05B 3/03
(52) U.S. Cl. .................... 219/438; 219/386; 99/451; 99/483; 426/237; 426/244
(58) Field of Search ................................ 219/385, 386, 219/200, 201, 438, 441; 99/358, 451, 483; 426/237, 244, 523

(56) References Cited

U.S. PATENT DOCUMENTS

| | | | |
|---|---|---|---|
| 3,632,962 A | 1/1972 | Cherniak | 219/200 |
| 5,356,646 A | 10/1994 | Simic-Glavaski et al. | 426/237 |
| 5,447,733 A * | 9/1995 | Bushnell et al. | 426/237 |
| 5,609,900 A * | 3/1997 | Reznik | 426/244 |
| 5,718,934 A | 2/1998 | Hayakawa | 426/237 |
| 6,331,321 B1 * | 12/2001 | Robbins | 99/451 |
| 6,451,364 B1 * | 9/2002 | Ito | 426/244 |

FOREIGN PATENT DOCUMENTS

WO  00/44269  8/2000

OTHER PUBLICATIONS

International Search Report dated Jan. 17, 2003 for PCT/US02/34401.

* cited by examiner

Primary Examiner—Joseph Pelham
(74) Attorney, Agent, or Firm—Renner, Otto, Boisselle & Sklar, LLP

(57) ABSTRACT

A food treating apparatus and method wherein a reducing DC electric current is provided by a DC electric circuit, the food treating apparatus including a vessel and a handle, and wherein at least part of the electric circuit is integral with the handle and is operative to provide electrons to food in the vessel. Further, the added electrons inhibit and/or reduce the formation of acrylamides in the food prepared in the food treating apparatus.

5 Claims, 12 Drawing Sheets

ELECTRON SOURCE FOR FOOD TREATING APPARATUS AND METHOD

This application is a continuation-in-part of U.S. patent application Ser. No. 10/014,631, now U.S. Pat. No. 6,528,768, by Branimir Simic-Glavaski and Michael G. Simic, entitled ELECTRON SOURCE FOR FOOD TREATING APPARATUS AND METHOD, filed on Oct. 26, 2001.

FIELD OF THE INVENTION

The present invention relates generally to electron sources and specifically to electron sources for food treating apparatus and method for treating food.

BACKGROUND OF THE INVENTION

U.S. Pat. No. 5,356,646 to Simic-Glavaski et al. (hereinafter Simic-Glavaski), which is hereby incorporated by reference in its entirety, discloses that the ingestion of externally generated oxidative products such as food cooked by a thermal process may be carcinogenic or promoters for cardiovascular problems. When food is cooked by a thermal process it may tend to have a carcinogenic effect due to the depletion of electrons in the food. It is known that the food is depleted of electrons during a cooking process due to thermal excitation and oxidation.

Additionally, the adventitious formation of the potential cancer-causing agent acrylamide in a variety of foods during cooking has raised much concern. Acrylamide is a chemical used in the manufacture of plastics. Additionally, acrylamide may cause nerve damage.

Acrylamide forms in certain foods cooked at temperatures at or above 120° C. For example, acrylamide, develops in potato chips, french fries, bread and processed cereals cooked at or above 120° C. Levels of acrylamide in certain starch-based foods, such as potato chips, french fries, cookies, cereals and bread, are above the recommended levels in the World Health Organization's Guidelines Values for Drinking Water Quality.

Deep fried french fries, such as those cooked at fast-food establishments, showed the highest levels of acrylamide among the foods tested by the Center for Science in the Pubic Interest (CSPI). For example, large orders of french fries tested by the CSPI contained an amount of acrylamide between about 39 to about 82 micrograms. Further, the amount of acrylamide in a large order of fast-food french fries is at least 300 times more than what the U.S. Environmental Protection Agency allows in a glass of water.

Other foods tested by CSPI include one-ounce portions of Pringles potato chips which contained about 25 micrograms. Corn-based Fritos and Tositos contained half that amount or less. Regular and Honey Nut Cheerios contained between about 6 or 7 micrograms of acrylamide.

One possible way acrylamide forms in potatoes and cereals is by the Maillard reaction as reported recently in Nature (see, for example, D. S. Mottram, B. L. Wedzicha and A. T. Dodson, Nature, Volume 419, 3 Oct. 2002, www.nature.com/nature, page 448 and R. H. Stadler, I. Blank, N. Varga, F. Robert, J. Hau, P. A. Guy, M. Robert and S. Riediker, Nature, Volume 419, 3 Oct. 2002, page 449). Products of the Maillard reaction are responsible for flavor and color generated during cooking.

An important associated reaction is the degradation of amino acids to form aldehydes. Asparagine, a major amino acid component (940 mg kg$^{-1}$, representing 40% of the total amino acid content in potatoes), reacts with glucose at temperatures above 120° C. to form significant quantities of acrylamide. For example, a reaction between an equimolar mixture of asparagine and glucose at 185° C. in a phosphate buffer produces about 221 milligrams of acrylamide per mol of amino acid. The same reaction without any solution (dry mixture) produces about 25 milligrams of acrylamide per mol of amino acid.

The reaction kinetics show a strong dependence on temperature. Peak acrylamide formation for an equimolar mixture of asparagine and glucose in a phosphate buffer is observed at 170° C. About 420 milligrams per mol of amino acid is produced. At 150° C. and 185° C., the amount of acrylamide is in a range of about 220 milligrams.

While temperature and the presence of a buffer solution are important reaction parameters, time is also important.

Thus, aldehydes and aminoketones may act as precursors in the acrylamide formation. Therefore, reduction or elimination of these precursors will inhibit and/or reduce the formation of acrylamide in food.

Simic-Glavaski discloses by adding electrons to food that is in a cooking vessel or in contact with a grill carcinogenic effect or promoters for cardiovascular problems can be reduced. Simic-Glavaski discloses a cooking apparatus and a method of supplying electrons (reducing electrons) to food that is contained in the vessel or that is in contact with the grill.

In an embodiment disclosed by Simic-Glavaski, respective electrodes are placed in a cooking medium, such as oil, water or the like, and electric potential and electric current are provided thereby to food. It would be desirable to integrate the electron source into a food treating apparatus, such as a cooking apparatus such as a pot, a grill, a fryer (shallow, deep or any other type) or the like. In the embodiment disclosed by Simic-Glavaski, the electrons are provided from a relatively localized source. It would be advantageous to increase the area over which the electrons are provided in the food treating apparatus. By increasing the area over which the electrons are supplied, more electrons are provided over a larger portion of the food product.

Therefore, there is a strong need in the art to improve the distribution of electrons into a food product in a food cooking, cooling, storing or the like apparatus and process. There also is a need to enhance the countering of the carcinogenic effect that occurs during a food treating process, such as, for example, cooking, cooling, storing, serving, etc. Further, there is a need to inhibit and/or reduce the formation of harmful substances, e.g., acrylamide, during the food treating process.

As used herein the term "food treating" is broadly understood to mean cooking, cooling, storing, serving, or the like, as are further described below.

SUMMARY OF THE INVENTION

An aspect of the invention relates to inhibiting and/or reducing acrylamide formation in food.

Another aspect of the invention relates to inhibiting and/or reducing acrylamide formation during food treating.

Another aspect of the invention relates to a food treating apparatus wherein an electric current is provided by an electric circuit, the food treating apparatus including a vessel and a handle, and wherein at least part of the electric circuit is integral with the handle and is operative to provide electrons to food in the vessel.

Another aspect of the invention relates to a food treating apparatus having a handle and a vessel for food, comprising a circuit for providing electrons for distribution via the vessel to food, the circuit including an anode, a resistive element and a connection to the vessel, and wherein at least part of the anode is in the handle.

Another aspect of the invention relates to a method of providing electrons for absorption by an oxidizing medium including the step of providing an electric current by an electric circuit wherein at least part of the electric circuit is integral with a handle and is operative to provide electrons to food in a vessel.

Another aspect of the invention relates to a method of treating food. The method includes the steps of: placing the food relative to a food treating apparatus, and inhibiting acrylamide formation in the food by supplying free electrons for absorption by the food by applying an electric current and reducing potentials to the food treating apparatus.

Another aspect of the invention relates to a food treating apparatus. The food treating apparatus includes a vessel, an electron source electrically coupled to the vessel; and an electric circuit for providing electrons to a food, wherein at least part of the electric circuit is integral with the electron current source and is operative to provide electrons to the food in the vessel to inhibit the formation of acrylamide in the food.

DETAILED DESCRIPTION

Figure 1:
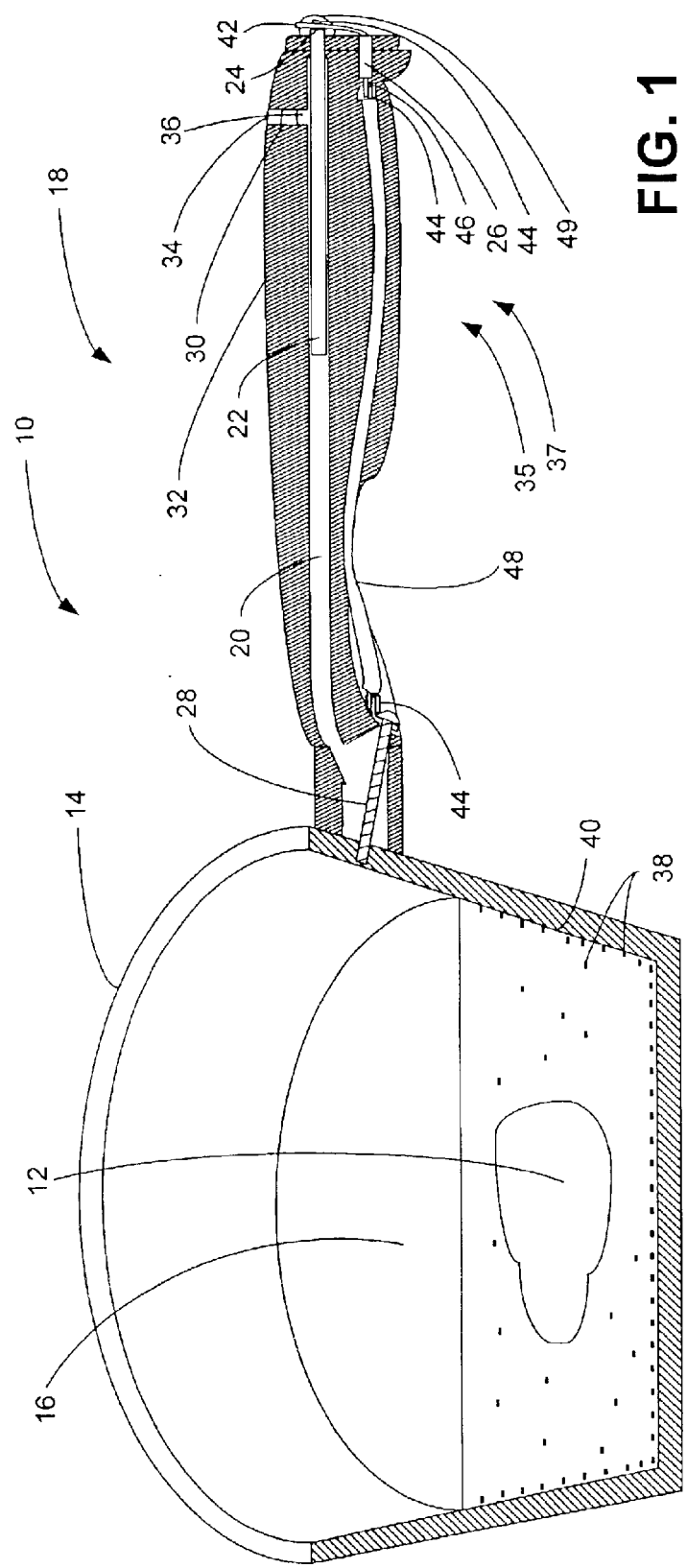
FIG. 1 is a schematic cross-sectional view of a food treating apparatus in accordance with an embodiment of the present invention.
Figure 2:
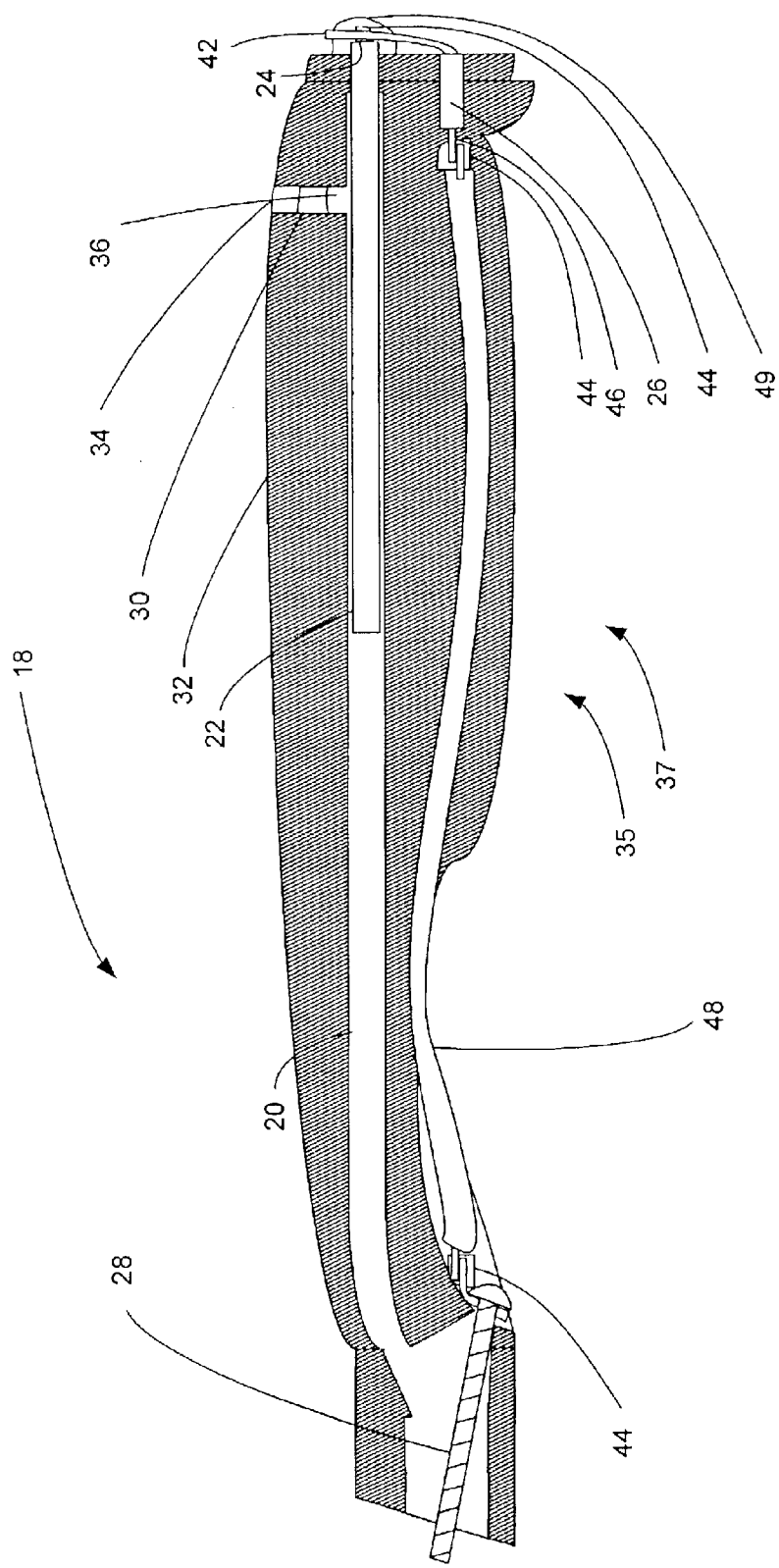
FIG. 2 is an enlarged schematic cross-sectional view of the handle of the food treating apparatus of FIG. 1.

With reference to FIGS. 1 and 2, a food treating apparatus 10 for providing electrons for absorption by a food material 12 is shown. The food treating apparatus 10 includes a vessel 14 having sufficient volume to contain the food material 12. The vessel 14 may be a storage container, cooling container, preparing container, warming container, serving dish or any of a variety of cooking vessels; non-limiting examples include a pot, pan, cookware, grill, skillet, kettle, dish, bowl, wok, appliance or the like and associated utensils. Non-limiting examples of utensils may include a probe, a skewer, a spit, a wire mesh basket or the like. The vessel 14 may be made of any conductive material, e.g., metal, stainless-steel, iron, copper, aluminum, aluminum alloy or the like. The vessel 14 may act as a cathode. The vessel 14 may be coated with a nonstick conductive coating to prevent the food medium 12 from sticking to a surface. The food material 12 may be placed in the vessel 14 in a quantity of a medium 16. The medium 16 may be an oxidizing medium, e.g., water, sauce, oil, fat, or other medium used in a boiling, cooling, warming, steaming, basting, skewering, sauteing, baking, roasting, frying or deep frying process or other cooking, storing, cooling, preparing or treating process.

A handle 18 may be permanently or temporarily attached to the vessel 14. The handle 18 includes a passage 20 running through at least a part of the handle 18. An anode 22 may be contained partly within the passage 20. An end 24 of the anode 22 is electrically coupled with a resistive element 26. The resistive element 26 is electrically coupled with the vessel 14 by a conductive fastener 28. The anode 22 may be made of a conductive material such as, for example, metals like copper, zinc, aluminum or some other conductive material or possibly a semiconductive material. The passage 20 includes a passage opening 30 at the surface 32 of the handle 18. The passage opening 30 may be closed with a removable plug 34. The conductive fastener 28 may be, for example, a flat head screw, clamp, rivet, conductive weld or the like.

A circuit 35 is formed. The circuit 35 includes the anode 22 electrically coupled with the resistive element 26, which in turn is electrically coupled with the vessel 14. The vessel 14 acts as a cathode in the circuit 35. When the electrolyte 36 is introduced into the passage 20 containing the anode 22, a primary electrochemical battery 37 is formed due to the potential differential between the anode 22 and the cathode, i.e., the vessel 14. The anode 22 may be formed of a conductive material with a higher electrical potential than the electrical potential of the vessel 14 so the vessel 14 becomes the cathode of the circuit 35 and battery 37. The resistive element 26 may be a resistor or some other impedance that cooperates with the anode 22 and the vessel 14 (cathode) to provide current flow. Thus, the vessel 14 (cathode) in the circuit 35 is supplied with electrons for delivery directly into the cooking medium 16 and to the food medium 12. Although the circuit 35 is shown to include the anode 22, the resistive element 26 and the vessel 14 (cathode), it is understood that the circuit 35 could include other elements, for example, switches, other resistors, a capacitor, an inductor or the like.

The electrochemical battery 37 produces a current wherein electrons 38 flow to a surface 40 of the vessel 14. The electrons 38 may be absorbed by the food material 12 where the food material 12 comes in contact with the surface 40. Excess electrons 38 flowing from the anode 22 to the vessel 14 are absorbed by the food material 12 to replace electrons lost by the thermally-induced oxidation of the cooking process, and may result in the food material 12 being electron enriched at the end of the cooking process or at least in effect less electron depleted than would otherwise be the case. Although the absorption of electrons by the food material 12 is described in relationship to a cooking process, it would be understood by those skilled in the art that the invention may be used during cooling, storing, preparing or other food treating processes. Alternatively or additionally, the electrons 38 and/or negative ions (sometimes collectively referred to herein as "electrons") may flow from the cathode, i.e., the vessel 14, all through the medium 16 to the food material 12 to be absorbed by the food material 12.

FIG. 2 is an enlarged drawing of the handle 18 illustrating several wires and connections in the circuit 35 leading to the vessel 14 (not shown). A wire 42 from an end of the resistive element 26 is electrically coupled with the end 24 of the anode 22 by an electrical connection 44, e.g., solder, conductive adhesive, threaded connection or by some other means as is known by those who have ordinary skill in the art. Another electrical connection 44 electrically couples a wire 46 from another end of the resistive element 26 with a first end of a wire 48. A second end of the wire 48 is electrically coupled by yet another electrical connection 44 with the conductive fastener 28. The wires 42, 46 and 48 may be made of a conductive material, e.g., aluminum, copper or the like. Further, the wire 48 may be insulated by an insulating material which encases the conductive material. Additionally, the wire 48 may be partially contained within the handle and isolated from the passage 20 containing the anode 22.

The handle 18 may be made of any material that is suitably used for cookware, etc. For example, the handle may be of an insulative material, electrically nonconductive material, thermally insulative material, thermally nonconductive material, plastic, phenolic, glass, ceramic, wood or some other material that has suitable strength and rigidity characteristics for the desired purpose or desired use with cookware, food storage containers, etc., as are mentioned elsewhere herein. The handle may be electrically conductive, e.g., metal, with suitable electrical insulation provided.

The handle 18 may be formed of a substantially solid material that is drilled out to provided the passage 20 for the anode 22. Additionally, the handle 18 may be drilled out to provide the passage opening 30 for delivering the electrolyte 36 into the passage 20 for contact with the anode 22 and provide an electrochemical potential. If desired, the handle 18 may be molded in such a way as to provide the passage 20 for the anode 22 and also the passage opening 30 for the electrolyte 36, as described. Additionally, the handle 18 may be drilled to provide space for the various wires and connections illustrated or may be molded to provide the various passages for the wires and/or connections. Moreover, the handle 18 may be molded directly to the respective anode 22 and wires, as well as the various connections provided, for example, as is illustrated in FIG. 2. Such direct molding enhances the integrity of the handle and may provide for protection of the various connections between the wires, etc. To provide adequate space in the passage 20 for both the anode and electrolyte, standoffs (or the like) may be used to locate the anode in the passage 20 as the passage itself is defined during the molding process. These are just examples of various ways in which the handle 18 may be made and of materials of which the handle 18 may be made. However, it will be appreciated by those having ordinary skill in the art that the handle 18 may be made of other materials and/or using other processes or methods.

Figure 3:
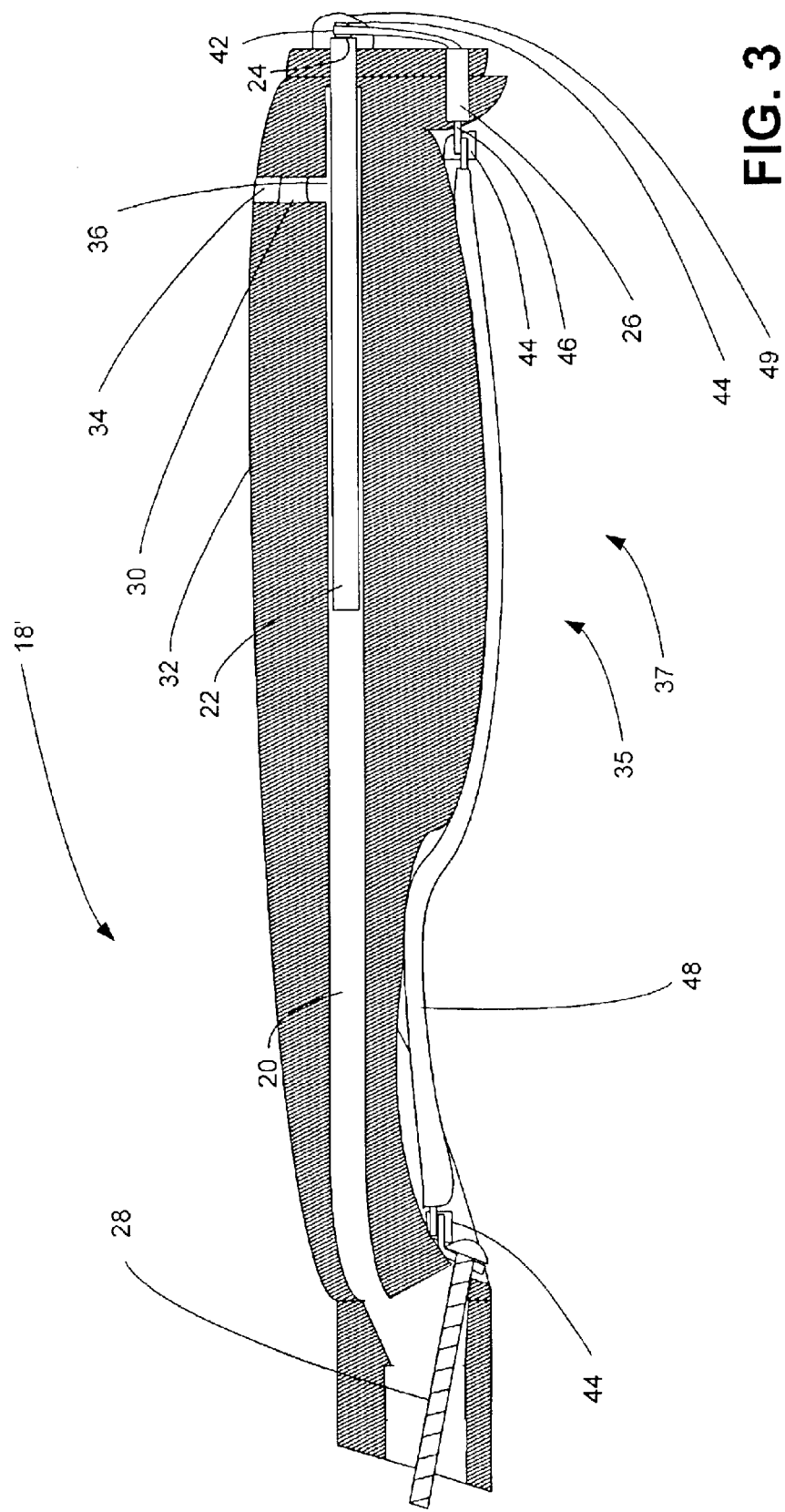
FIG. 3 is a schematic cross-sectional view of another embodiment of a handle for a food treating apparatus.

FIG. 3 illustrates an alternative embodiment of a handle 18' of an electron generating cooking apparatus, such as described above. In this embodiment, the wire 48 is mounted on an outside surface of the handle 18'. An advantage of this embodiment is the reduction of the number of manufacturing steps required to manufacture the handle 18'. Another advantage of this embodiment is the accessability of the wire 48 and electrical connections 44 should a repair or replacement be required.

Figure 4:
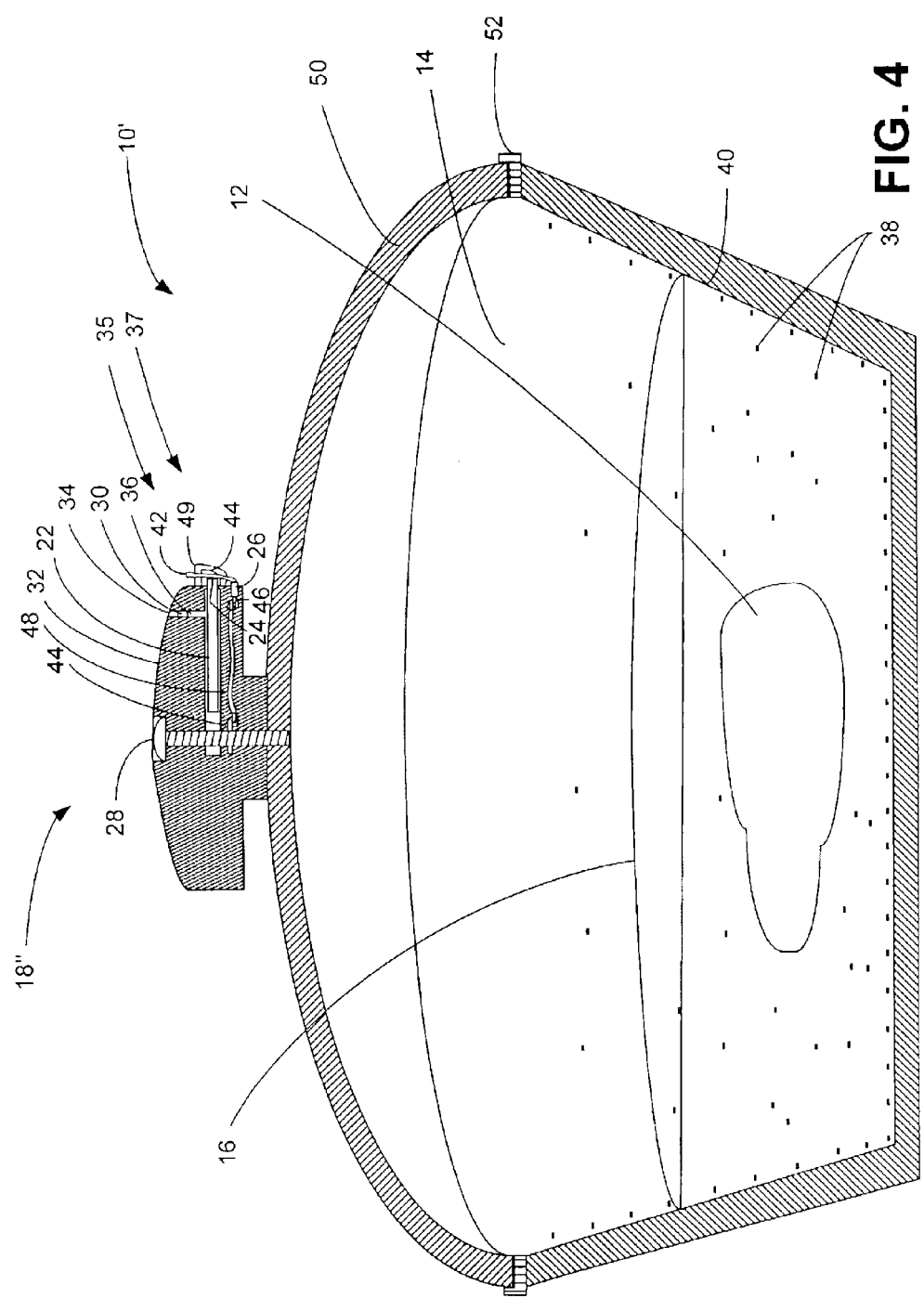
FIG. 4 is a schematic cross-sectional view of another embodiment of a food treating apparatus with a handle on the apparatus lid.
Figure 5:
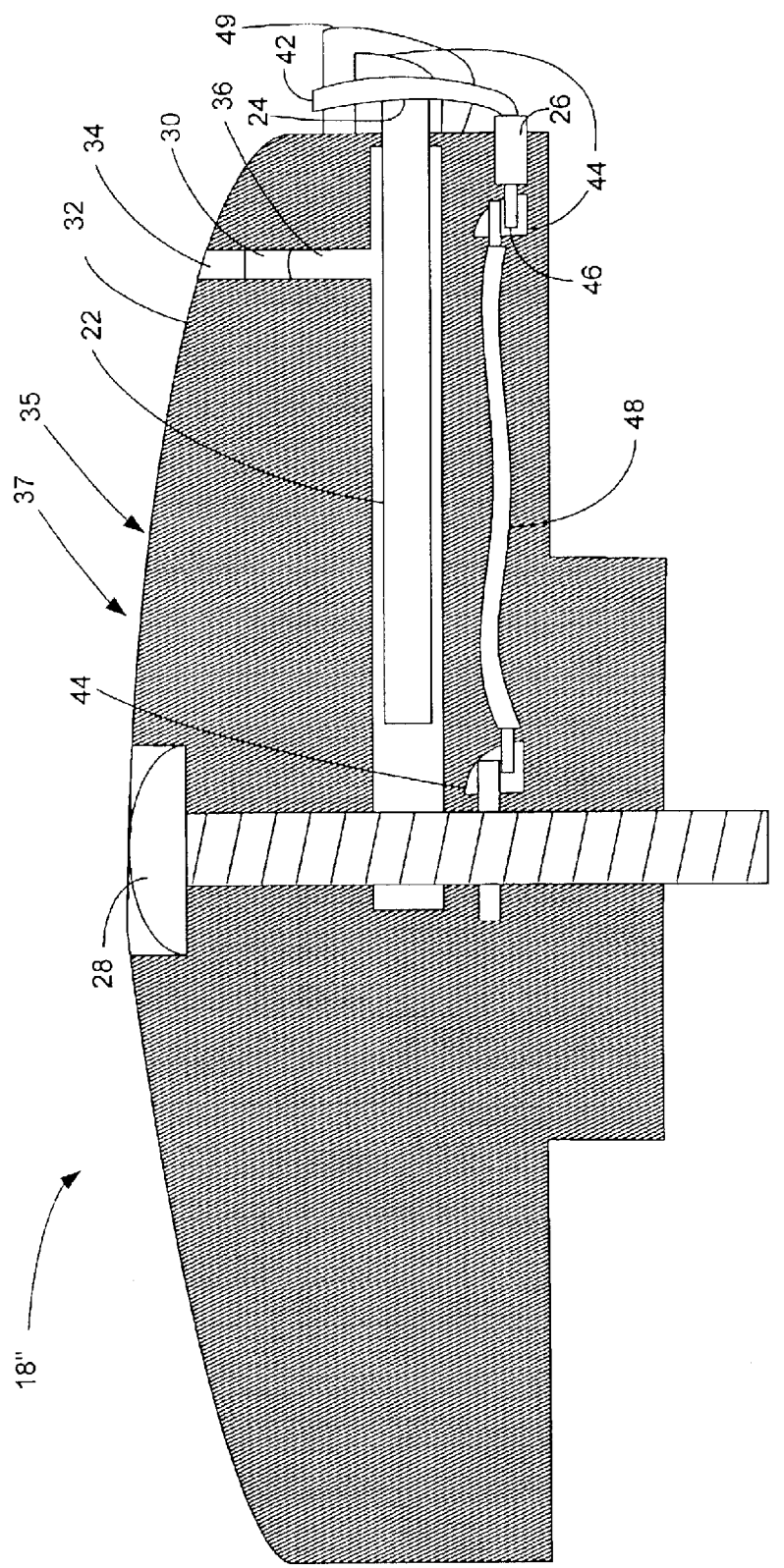
FIG. 5 is an enlarged schematic cross-sectional view of the handle of the food treating apparatus of FIG. 4.

FIGS. 4 and 5 illustrate another embodiment of a food treating apparatus 10' of the invention wherein electrons are provided to the vessel 14 via an electron source provided in a lid 50, a cover or the like. The circuit 35 is formed by the anode 22 electrically coupled with the resistive element 26 which in turn is electrically coupled with the vessel 14 acting as a cathode as described above. In this embodiment, the resistive element 26 is electrically coupled with a conductive fastener 28 which may be permanently or temporary attached to the lid 50. The lid 50 provides a path for the electrons to reach the vessel 14 when placed on a rim 52 which is formed on the vessel 14. The lid 50 and the rim 52 may be made of the same electrically conductive material as the vessel 14 or another suitable material which allows the electrons to flow to the vessel 14. FIG. 5 illustrates a more detailed drawing of the handle 18".

Figure 6:
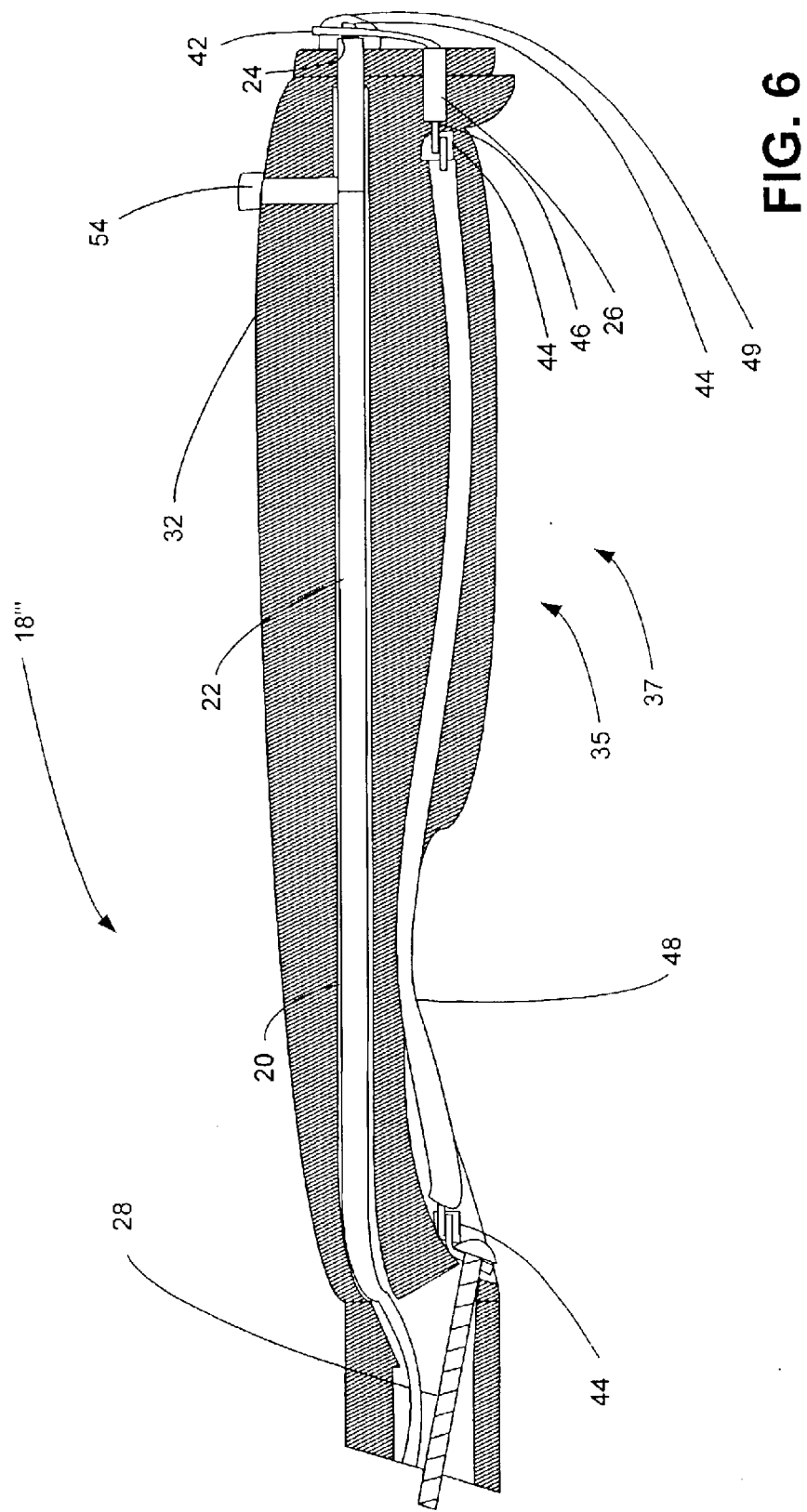
FIG. 6 is a schematic cross-sectional view of yet another embodiment of a handle for a food treating apparatus.

FIG. 6 illustrates an alternate embodiment of a handle 18''' for an electron producing food treating apparatus 10, for example. In this embodiment, a current source to the anode 22 and the vessel 14 is provided by a solar cell 54 mounted integrally upon the handle 18'''. The term "solar cell" is understood to mean any device that provides an electrical output in response to one or more of visible light, UV, IR or the like. In this embodiment, the solar cell 54 can produce a current of, for example, five microamps to 500 nanoamps sufficient to provide an adequate source of electrons to flow which can be absorbed by the food being cooked to maintain or supplement electron content of the food material 12. An advantage of this embodiment is the availability of ambient energy to replace or to supplement a battery or other source. Alternatively, the solar cell 54 may be integrally formed in the handle 18''' such that the upper surface of the solar cell 54 is flush with the surface 32 of the handle 18'''.

In the detailed description that follows, components similar to the components described above with regard to FIGS. 1 and 2 will have a similar reference numeral incremented by 100. For example, in the embodiment illustrated in FIGS. 1 and 2, a vessel is assigned reference number 14. The embodiments described below will use the reference number 114, although the vessel has a different configuration in the different embodiments. Accordingly, reference numbers may appear out of sequence in order to maintain the above-described relationship. For the sake of brevity, in-depth descriptions of similar components may be omitted from the description of the following embodiments.

Figure 7:
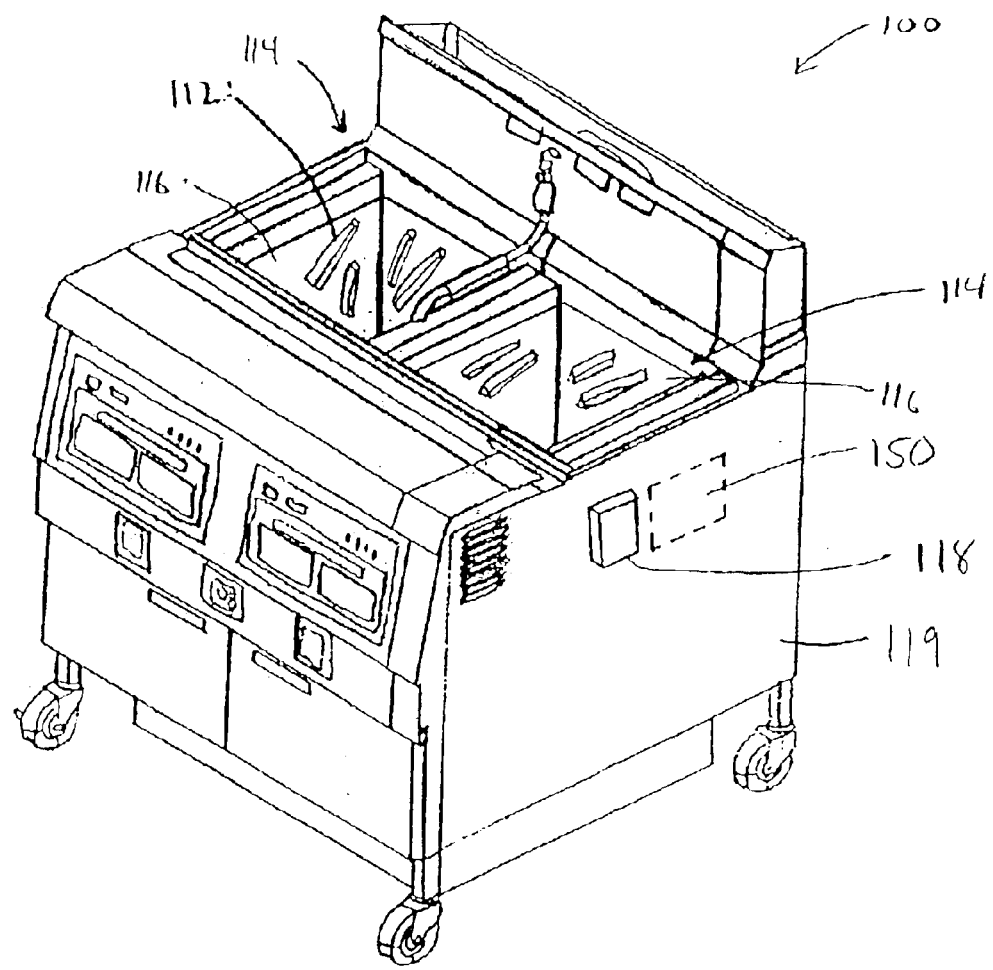
FIG. 7 is a perspective view of a food treating apparatus in accordance with another embodiment of the present invention.
Figure 8:
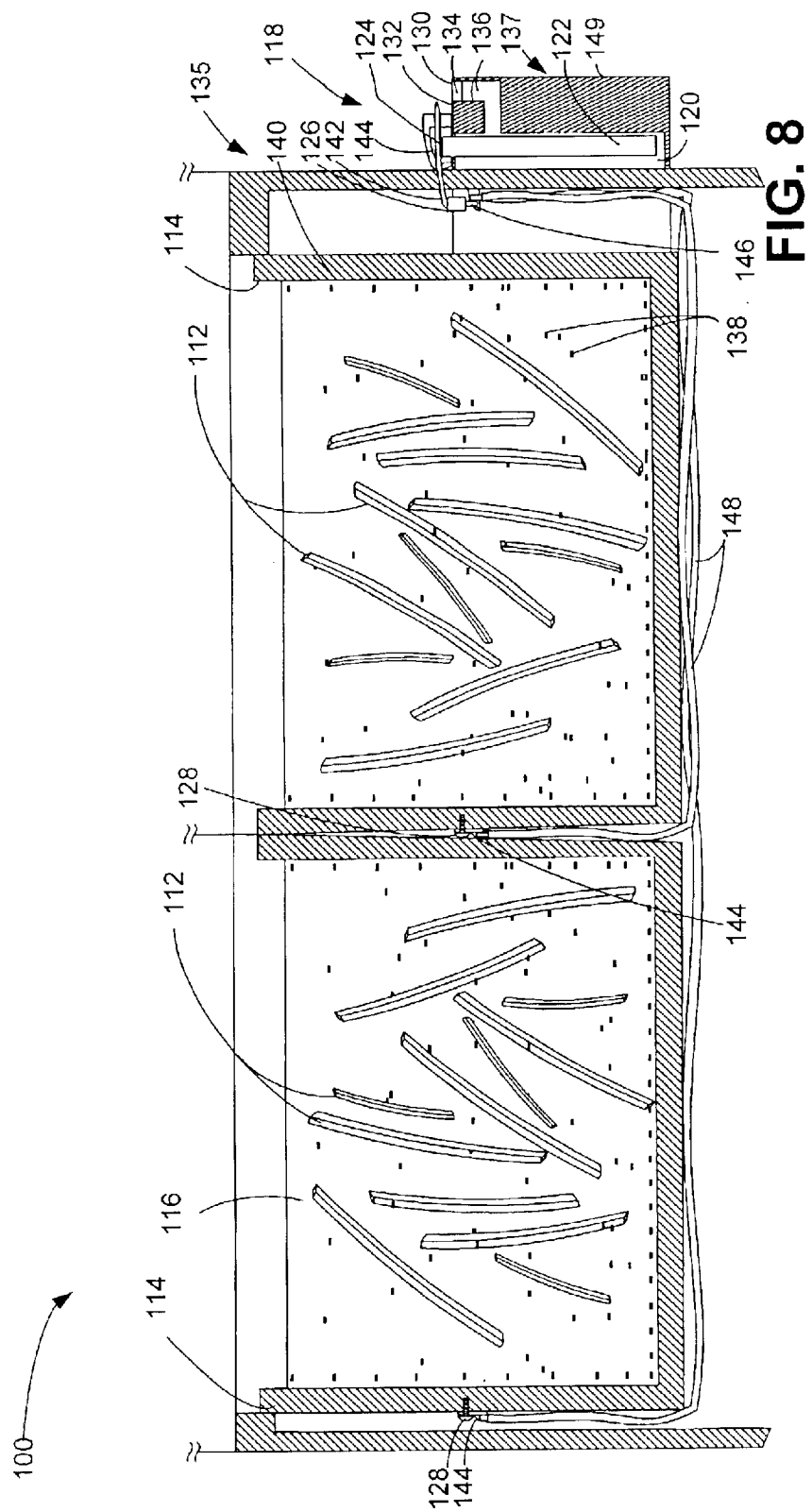
FIG. 8 is a partial schematic cross-sectional view of the food treating apparatus of FIG. 7.

With reference to FIGS. 7 and 8, a food treating apparatus 100, for providing electrons for absorption by a food material 112, is illustrated as a commercial deep fryer. Not shown in FIG. 7 are additional parts of a working commercial deep fryer, such as a power source, control knobs and other parts of the structure which would be included in a complete, working commercial deep fryer. These additional parts are not necessary to the present invention, and for simplicity and brevity are neither shown nor described. Nevertheless, how such parts could be added will be easily understood by those of skill in the art.

The food treating apparatus 100 includes a vessel 114 having sufficient volume to contain the food material 112.

The vessel 114 is illustrated as a medium containing reservoir of the commercial deep fryer. The vessel 114 may be made of any conductive material, for example, metal, stainless-steel, iron, copper, aluminum, aluminum alloy or the like. The vessel 114 may be made of non-conductive material including cathode(s) and anode(s) inserted therein. The vessel 114 may be coated with a nonstick conductive coating to prevent the food material 112 from sticking to a surface 140. The vessel 114 may act as a cathode in an electrical circuit further described below.

The food material 112 may be placed in the vessel 114 in a quantity of a medium 116. The medium 116 may be an oxidizing medium, for example, water, sauce, oil, fat, or other medium used in a boiling, cooling, warming, steaming, basting, skewering, sauteing, baking, roasting, frying or deep frying process or other cooking, storing, cooling, preparing or treating process. In the exemplary embodiment, the medium 116 is an oil used in a frying or a deep frying process.

An electron source 118 may be permanently or temporarily attached to a wall 119 of food treating apparatus 100. Referring now to FIG. 8, the electron source 118 includes a passage 120 running through at least a part of the electron source 118. An anode 122 may be contained partly within the passage 120. An end 124 of the anode 122 is electrically coupled with a resistive element 126. The resistive element 126 is electrically coupled with the vessel 114 by a conductive fastener 128. The anode 122 may be made of a conductive material such as, for example, metals like copper, zinc, aluminum or some other conductive material or possibly a semiconductive material. The passage 120 includes a passage opening 130 at a surface 132 of the electron source 118. The passage opening 130 may be closed with a removable plug 134. The conductive fastener 128 may be, for example, a flat head screw, a clamp, rivet, conductive weld, spring contact or the like.

A wire 142 from an end of the resistive element 126 is electrically coupled with the end 124 of the anode 122 by an electrical connection 144, e.g., solder, welding, conductive adhesive, threaded connection or by some other means as is known by those who have ordinary skill in the art. Another electrical connection 144 electrically couples a wire 146 from another end of the resistive element 126 with a first end of a wire 148. A second end of the wire 148 is electrically coupled by yet another electrical connection 144 with the conductive fastener 128.

The wires 142, 146 and 148 may be made of a conductive material, e.g., aluminum, copper or the like. Further, the wire 148 may be insulated by an insulating material which encases the conductive material. Additionally, the wire 148 may be partially contained within the vessel 114 (not shown). Additionally or alternatively, the wire 148 may be partially contained within a housing 149 of the electrical source 118 and isolated from the passage 120 containing the anode 122 (not shown).

The housing 149 of the electrical source 118 may be made of any material that is suitably used for cookware. For example, the housing 149 may be made of an electrically insulative material, electrically nonconductive material, thermally insulative material, thermally nonconductive material, plastic, phenolic, glass, ceramic, wood or some other material that has suitable strength and rigidity characteristics for the desired purpose or desired use with cookware. The housing 149 may be electrically conductive, for example, metal, with a suitable electrical insulation provided.

The housing 149 of the electron source 118 may be formed of a substantially solid material that is drilled out to provided the passage 120 for the anode 122. Additionally, the housing 149 of the electron source 118 may be drilled out to provide the passage opening 130 for delivering an electrolyte 136 into the passage 120 for contact with the anode 122. Examples of electrolytes include water, salt water or the like. Additionally, the housing 149 of the electron source 118 may be drilled to provide space for the various wires and connections illustrated or may be molded to provide the various passages for the wires and/or connections.

If desired, the housing 149 of the electron source 118 may be molded in such a way as to provide the passage 120 for the anode 122 and also the passage opening 130 for the electrolyte 136, as illustrated in FIG. 8. Moreover, the housing 149 of the electron source 118 may be molded directly to the respective anode 122 and wires, as well as the various connections provided. Such direct molding enhances the integrity of the housing 149 and may provide for protection of the various connections between the wires, etc. To provide adequate space in the passage 120 for both the anode and the electrolyte, standoffs (or the like) may be used to locate the anode 122 in the passage 120 as the passage itself is defined during the molding process.

These are just examples of various ways in which the housing 149 of the electron source 118 may be made and of materials of which the housing of the electrical source may be made. However, it will be appreciated by those having ordinary skill in the art that the housing 149 of the electron source 118 may be made of other materials and/or using other processes or methods.

A circuit 135 is formed. The circuit 135 includes the anode 122 electrically coupled with the resistive element 126, which in turn is electrically coupled with the vessel 114. The vessel 114 acts as a cathode in the circuit 135. When the electrolyte 136 is introduced into the passage 120 containing the anode 122, a primary electrochemical battery 137 is formed due to the potential difference between the anode 122 and the cathode, i.e., the vessel 114.

The anode 122 may be formed of a conductive material with a higher electrical potential than the electrical potential of the vessel 114 so the vessel 114 becomes the cathode of the circuit 135 and the battery 137. The resistive element 126 may be a resistor or some other impedance that cooperates with the anode 122 and the vessel 114 (cathode) to provide current flow. Thus, the vessel 114 (cathode) in the circuit 135 is supplied with electrons for delivery directly into the cooking medium 116 and to the food material 112. Although the circuit 135 is shown to include the anode 122, the resistive element 126 and the vessel 114 (cathode), it is understood that the circuit could include other elements, for example, switches, other resistors, a capacitor, an inductor, a variable control or the like or even a different cathode.

The electrochemical battery 137 produces a current wherein electrons 138 flow to the surface 140 of the vessel 114. The electrons 138 may be absorbed by the food material 112 where the food material 112 comes in contact with the surface 140. Excess electrons 138 flowing from the anode 122 to the vessel 114 are absorbed by the food material 112 to replace electrons lost by the thermally-induced oxidation of the cooking process, and may result in the food material 112 being electron enriched at the end of the cooking process or at least in effect less electron depleted than would otherwise be the case. Additionally, the excess electrons are believed to inhibit and/or reduce the formation of acrylamide in the food material 112. Alternatively or additionally, the electrons and/or negative ions 138 may flow from the cathode, i.e., the vessel 114, all through the medium 116 to the food material 112 to be absorbed by the food material.

Figure 9:
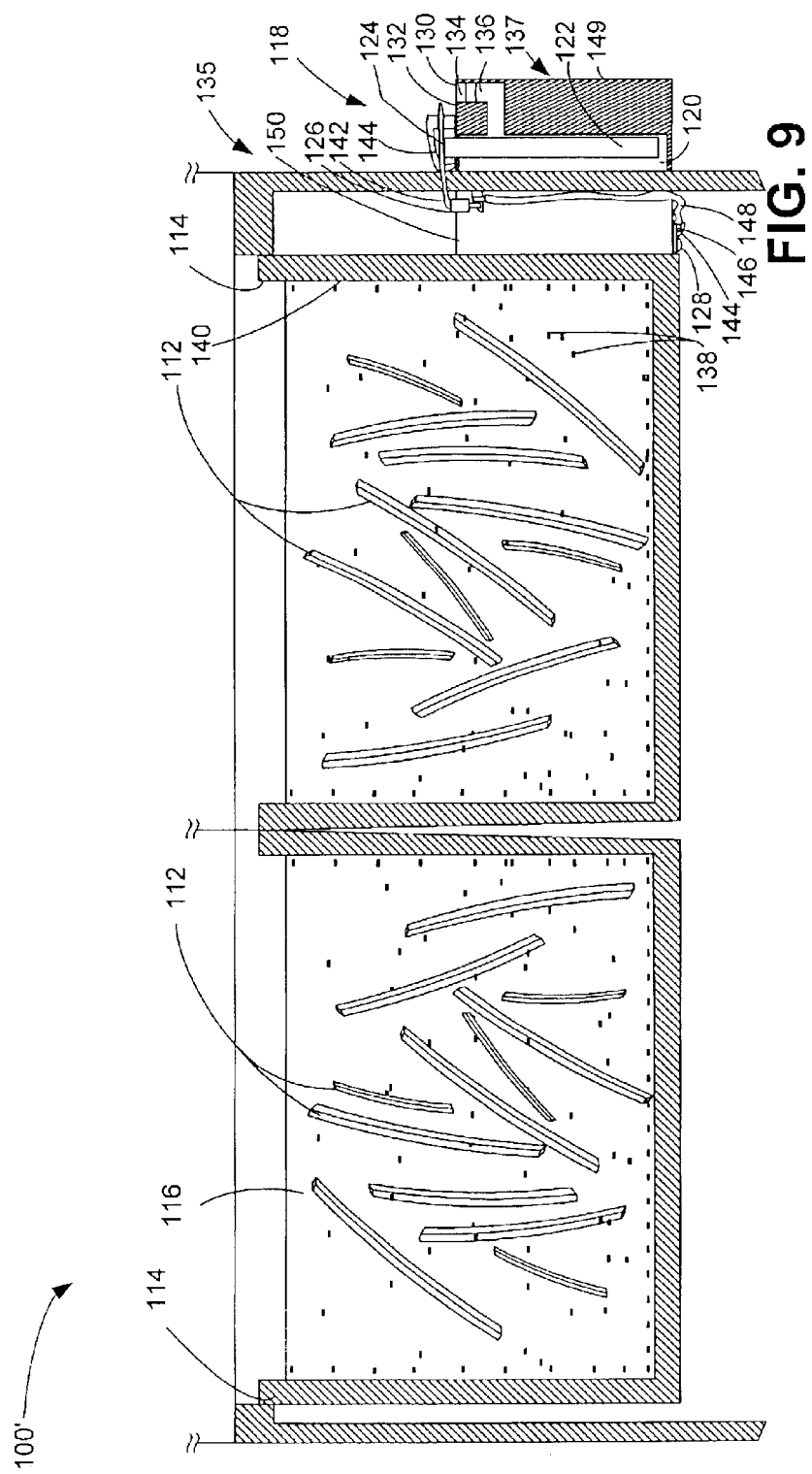
FIG. 9 is a partial schematic cross-sectional view of another embodiment of the food treating apparatus of FIG. 7.

FIG. 9 illustrates an alternative embodiment of a food treating apparatus 110' of the invention wherein electrons are provided to the vessel 114 acting as a cathode as described above. In this embodiment, the resistive element 126 is selectively coupled with a conductive fastener 128 which may be permanently or temporarily attached to an additional reducing housing 150. The additional reducing housing 150 provides a path for the electrons to reach the vessel 114. The additional reducing housing 150 may be made of the same electrically conductive material as the vessel 114 or another suitable material which allows electrons to flow to the vessel 114.

In another embodiment, the electron source 118 supplies excess electrons 138 to an inner surface (not shown) of the additional reducing housing 150. The additional reducing housing 150 is configured to circulate the medium 116 contained in the vessel 114 through the additional reducing housing 150 and back to the vessel 114. As the medium 116 is circulated through the additional reducing housing 150 the excess electrons 138 flow from the inner surface all through the medium 116. The medium 116 with the excess electrons 138 flows back to the vessel 114 to provide excess electrons 138 to the surface 140 and/or to the food material 112. The food material 112 absorbs the excess electrons 138 by coming in contact with the excess electrons 138. The food material may come in contact with the excess electrons 138 either by contacting the excess electrons 138 on the surface 140 or by contacting the excess electrons 138 suspended in the medium 116.

In another embodiment, the additional reducing housing 150 may be a filter housing. The additional reducing housing 150 is configured to circulate the medium 116 contained in the vessel 114 through the additional reducing housing 150 and back to the vessel 114 as described above. A filter is inserted in the additional reducing housing 150 to come in contact with the medium 116 and remove unwanted particles therefrom. As described above, the electron source 118 supplies excess electrons 138 to an inner surface (not shown) of the additional reducing housing 150. As the medium 116 is circulated through the additional reducing housing 150 the excess electrons 138 flow from the inner surface all through the medium 116. The medium 116 with the excess electrons 138 flows back to the vessel 114 to provide excess electrons 138 to the surface 140 and/or to the food material 112. The food material 112 absorbs the excess electrons 138 by coming in contact with the excess electrons 138. The food material may come in contact with the excess electrons 138 either by contact with the excess electrons 138 on the surface 140 or by contacting the excess electrons 138 suspended in the medium 116. Additionally or alternatively, the electron source 118 may be configured to supply excess electrons 138 to the filter. Thus, additional excess electrons may be supplied to the medium 116 for treating the food material 112 contained in the vessel 114.

The following examples relate to cooking oils and their use in food treating. These examples are illustrative and not intended to be limiting in scope. Unless otherwise indicated, the temperature is ambient temperature (e.g., room temperature about 25° C.), the pressure is normal atmospheric pressure (i.e., about 1 atmosphere), amounts are by weight and the temperature is in degrees Celsius.

EXAMPLE 1

Color is widely used as an index of oil quality. Oil color darkens as the amount of time the oil is used for heating or frying increases. Oil usage as indicated by oil color can be monitored using single or multiple wavelengths with a spectrometer. Color is recorded and compared for samples of two sample oils, i.e., Sample A Oil and Sample B Oil under various conditions. First, the color is recorded for a reference sample of each sample oil. Next, the color is recorded for a sample of each oil heated in a conventional cooking apparatus. Then, the color is recorded for a sample of each oil heated in a food treating apparatus of the present invention.

Specifically, a 100 milliliter (ml) sample of the Sample A Oil (Reference Sample A Oil) is placed in a clear jar. Next, a UV/Visible absorption spectra is recorded for Reference Sample A Oil using a Perkin Elmer Lambda 4B spectrophotometer with 10 millimeter (mm) glass cuvettes.

Next, a conventional cooking apparatus, for example, a stainless steel pot, is charged with 100 ml of Sample A Oil. This sub-sample is called Sample "a", which is heated to a temperature of about 185° C. and maintained at about 185° C. for approximately 10 minutes. The temperature is closely monitored to maintain the temperature within about ±5° C. using a temperature control and a thermocouple. Then, Sample a is allowed to cool to room temperature. After Sample a reaches room temperature, it is placed in a clear jar similar to the clear jar containing Reference Sample A Oil. Next, a UV/Visible absorption spectra is recorded for Sample a using a Perkin Elmer Lambda 4B spectrophotometer with 10 millimeter (mm) glass cuvettes.

Next, a food treating apparatus of the present invention is charged with 100 ml of Sample A Oil (hereinafter called Sample b). The food treating apparatus of the present invention may be, for example, a stainless steel pot similar to the one described above with regard to the heating of Sample a, but configured with the handle 18''' illustrated in FIG. 6. Sample b is heated to a temperature of about 185° C. and maintained at about 185° C. for approximately 10 minutes. The temperature is closely monitored to maintain the temperature within about ±5° C. using a temperature control and a thermocouple. Then, Sample b is allowed to cool to room temperature. After Sample b reaches room temperature, Sample b is placed in a clear jar similar to the clear jars containing Reference Sample A Oil and Sample a. Next, a UV/Visible absorption spectra is recorded for Sample b using a Perkin Elmer Lambda 4B spectrophotometer with 10 millimeter (mm) glass cuvettes.

Next, Samples a and b are compared to Reference Sample A Oil. Reference Sample A Oil is light yellow in color. Sample a, which is cooked at about 185° C. for approximately 10 minutes in the conventional cooking apparatus, is darker yellow in color. Sample b, which is cooked at about 185° C. for approximately 10 minutes in the food treating apparatus of the present invention, is a lighter yellow color lighter than Sample a, but darker than Reference Sample A Oil.

The above steps are repeated for samples of Sample B Oil. Similar results for the samples of Sample B oil are observed. The lighter yellow color of the samples cooked at about 185° C. for approximately 10 minutes in the food treating apparatus of the present invention may indicate that the quality of the oil after cooking in the present invention is better than the quality of oil cooked in a conventional cooking apparatus.

It is understood by those having ordinary skill in the art that oil color is influenced by a number of factors including the type and amount of oil and food used in frying. For example, food components can react with oils and oil degradation products to form colored Maillard products. Additionally, since oil color can result from more than one chemical process, the use of oil color to monitor oil should be only on a qualitative basis. That is, the color of only one oil under different cooking conditions should be compared. Further, a color index should not be used to evaluate frying performance of different oils.

EXAMPLE 2

A thiobarbituric acid (TBA) standard test (see, for example, Sample and Analysis of Commercial Fats and Oils, AOCS Official Method Cd 19-90, Reapproved 1997—Revised 2001, "2-Thiobarbituric Acid Value Direct Method", pages 1 and 2) may be conducted to measure the TBA result content in an oil used in the frying process. The TBA test measures aldehydes in a sample of the oil used in the frying process as an indicator of the oxidative rancidity of the oil. A liquid chromoto-graphy/mass sprectrophy/mass spectrophy (LC/MS/MS) test may be used to determine the acrylamide content in food, e.g., french fries. The LC/MS/MS test measures acrylamide content in parts per billion in a sample of food.

The TBA result content and/or the acrylamide content of foods cooked in a medium, e.g., oil, in a food treating apparatus of the present invention and a conventional cooking apparatus can be compared as described by the example below. Specifically, the TBA result content and/or the acrylamide content for foods fried in the apparatuses may be compared.

First, a reference sample of each sample oil is collected. Then, a sample of each sample oil is heated in each of the apparatuses. Next, food, i.e., french fries, is cooked in the sample of each sample oil in each of the apparatuses. A thiobarbituric acid (TBA) test is conducted on samples of Sample A Oil and Sample B Oil heated in the conventional cooking apparatus and the food treating apparatus of the present invention. A TBA test is conducted on the reference sample of each sample oil. The TBA result content for each sample is recorded in a table and illustrated in a bar graph for comparison.

Additionally, a LC/MS/MS test is conducted on samples of the food cooked (i.e., french fries) in Sample A Oil and Sample B Oil heated in the conventional cooking apparatus and the food treating apparatus of the present invention. The acrylamide content for each food sample is recorded in a table and illustrated in a bar graph for comparison.

Specifically, a 350 ml sample of Sample A Oil is placed in the conventional cooking apparatus, e.g., a stainless steel pot. A reference sample (reference sample of Sample A Oil) of 125 mg of Sample A Oil is removed from the conventional cooking apparatus. Next, the 125 mg reference sample of Sample A Oil is mixed with 25 ml of 1-butanol to form a solution. Afterwards, 5 ml of the reference Sample A Oil and 1-butanol solution is mixed with 5 ml of a TBA reagent solution and placed in a test tube. The test tube is closed and placed in a thermostated bath at about 95° C. for approximately 120 minutes. After approximately 120 minutes, the test tube is removed and cooled under running tap water for about 10 minutes. An absorbance spectra at an absorbance peak of about 530 nm is recorded using a Perkin Elmer Lambda 4B spectrophotometer with 10 millimeter (mm) glass cuvettes and compared to an absorbance peak at about 530 measured using distilled water as a reference cuvette. The reference cuvette is used as a standard test.

Next, the remaining oil of Sample A Oil is heated to a temperature of about 185° C. The temperature of the remaining oil of the Sample A Oil is maintained at about 185° C. for approximately 2 to 3 minutes (without french fries). Next, 120 grams of frozen french fries are introduced into the conventional cooking apparatus at the set temperature and fried for about 5 minutes. The temperature is closely monitored to maintain the temperature within about ±5° C. using a temperature control and a thermocouple.

Figure 10:
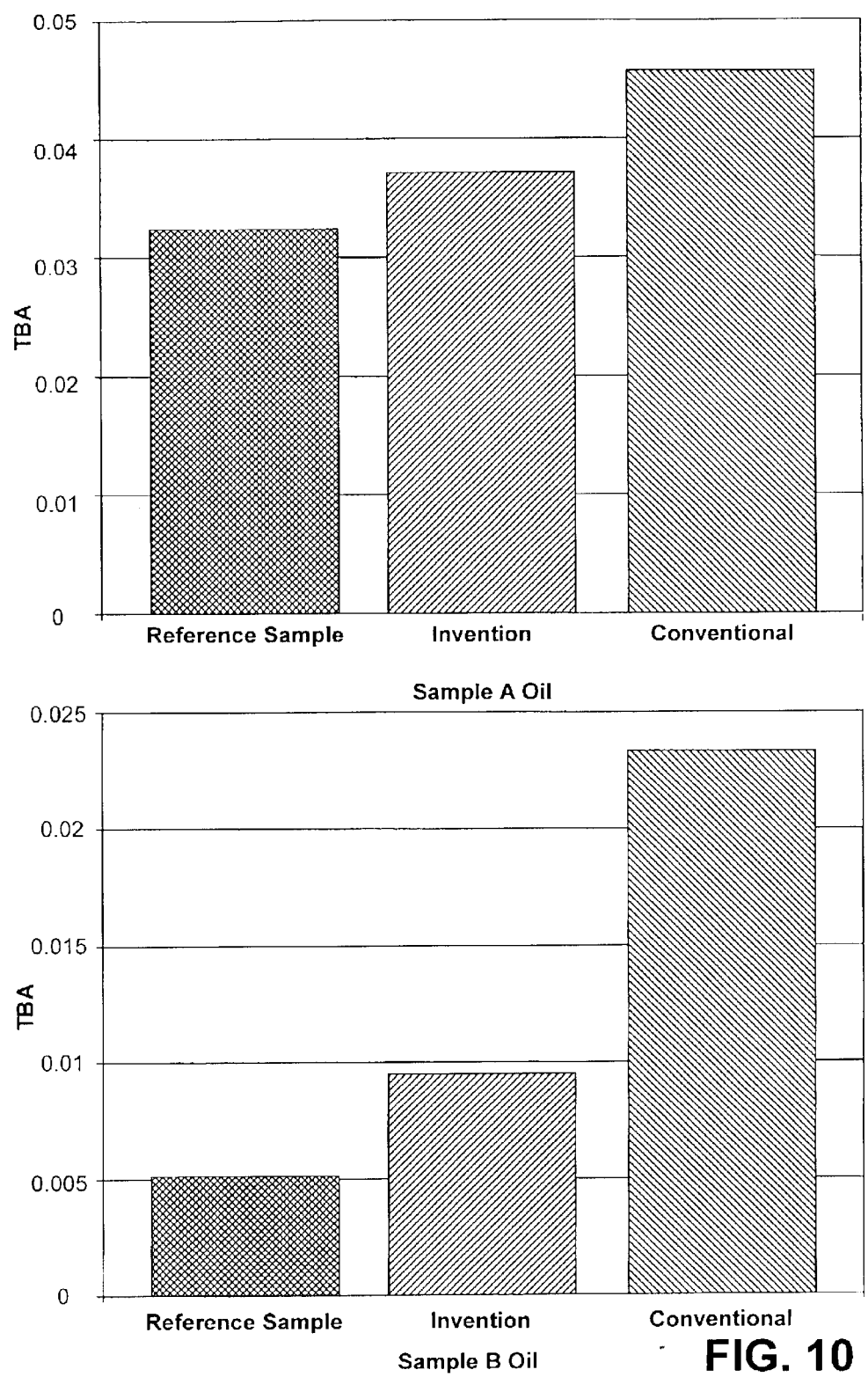
FIG. 10 presents bar charts showing thiobarbituric acid (TBA) result content in Sample A Oil and Sample B Oil for a reference oil and for samples of each oil heated in a food treating apparatus of the present invention and a conventional cooking apparatus.

After frying, the french fries are removed from the remaining oil of Sample A Oil and placed on trays with paper towels to cool to room temperature. Then, the remaining oil of Sample A Oil is allowed to cool to room temperature. Next, several 125 mg samples of the remaining oil of Sample A Oil are measured out and placed in separate glass vials. Next, each of the 125 mg samples of Sample A Oil is mixed separately with 25 ml of 1-butanol to form a solution. Afterwards, 5 ml of Sample A Oil and 1-butanol solution from each glass vial is mixed separately with 5 ml of a TBA reagent solution and placed in separate test tubes. The test tubes are closed and placed in a thermostated bath at about 95° C. for approximately 120 minutes. After 120 minutes, the test tubes are removed and cooled under running tap water for about 10 minutes. An absorbance spectra at 530 nm is recorded for each of the solutions contained in the test tubes using a Perkin Elmer Lambda 4B spectrophotometer with 10 millimeter (mm) glass cuvettes. The TBA result content is calculated and recorded in a table and illustrated in a bar graph, see FIG. 10. The TBA result content in Table I below and FIG. 10 is recorded in milligrams of malonaldehyde per kilogram of sample.

Next, a 350 ml sample of Sample A Oil is placed in the food treating apparatus of the present invention, e.g., the same stainless steel pot described above configured with the handle 18''' illustrated in FIG. 6. The sample of Sample A Oil is heated to a temperature of about 185° C. The temperature of the sample of the Sample A Oil is maintained at about 185° C. for approximately 2 to 3 minutes (without french fries). Next, 120 grams of frozen french fries are introduced into the food treating apparatus of the present invention at the set temperature and fried for about 5 minutes. The temperature is closely monitored to maintain the temperature within about ±5° C. using a temperature control and a thermocouple.

After frying, the french fries are removed from the sample of Sample A Oil and placed on trays with paper towels to cool to room temperature. Then, the sample of Sample A Oil is allowed to cool to room temperature. Next, several 125 mg samples of the sample of Sample A Oil are measured out and placed in separate glass vials. Next, each of the 125 mg samples of Sample A Oil is mixed separately with 25 ml of 1-butanol to form a solution. Afterwards, 5 ml of Sample A Oil and 1-butanol solution from each glass vial is mixed separately with 5 ml of a TBA reagent solution and placed in separate test tubes. The test tubes are closed and placed in a thermostated bath at about 95° C. for approximately 120 minutes. After approximately 120 minutes, the test tubes are removed and cooled under running tap water for about 10 minutes. An absorbance spectra at 530 nm is recorded for each of the solutions contained in the test tubes using a Perkin Elmer Lambda 4B spectrophotometer with 10 millimeter (mm) glass cuvettes. The TBA result content is calculated and recorded in a table and illustrated in a bar graph, see Table I below and FIG. 10.

Next, a 350 ml sample of Sample B Oil is placed in the conventional cooking apparatus, e.g., the stainless steel pot described above. A reference sample (reference sample of Sample B Oil) of 125 mg of Sample B Oil is removed from the conventional cooking apparatus. Next, the 125 mg reference sample of Sample B Oil is mixed with 25 ml of 1-butanol to form a solution. Afterwards, 5 ml of the reference Sample B Oil and 1-butanol solution is mixed with 5 ml of a TBA reagent solution and placed in a test tube. The test tube is closed and placed in a thermostated bath at about 95° C. for approximately 120 minutes. After approximately 120 minutes, the test tube is removed and cooled under running tap water for about 10 minutes. An absorbance spectra at 530 nm is recorded using a Perkin Elmer Lambda 4B spectrophotometer with 10 millimeter (mm) glass cuvettes.

Next, the remaining oil of Sample B Oil is heated to a temperature of about 185° C. The temperature of the remaining oil of Sample B Oil is maintained at about 185° C. for approximately 2 to 3 minutes (without french fries). Next, 120 grams of frozen french fries are introduced into the conventional cooking apparatus at the set temperature and fried for about 5 minutes. The temperature is closely monitored to maintain the temperature within about ±5° C. using a temperature control and a thermocouple.

After frying, the french fries are removed from the remaining oil of Sample B Oil and placed on trays with paper towels to cool to room temperature. Then, the remaining oil of Sample B Oil is allowed to cool to room temperature. Next, several 125 mg samples of the remaining oil of Sample B Oil are measured out and placed in separate glass vials. Next, each of the 125 mg samples of Sample B Oil is mixed separately with 25 ml of 1-butanol to form a solution. Afterwards, 5 ml of Sample B Oil and 1-butanol solution from each glass vial is mixed separately with 5 ml of a TBA reagent solution and placed in separate test tubes. The test tubes are closed and placed in a thermostated bath at about 95° C. for approximately 120 minutes. After approximately 120 minutes, the test tubes are removed and cooled under running tap water for about 10 minutes. An absorbance spectra at 530 nm is recorded for each of the solutions contained in the test tubes using a Perkin Elmer Lambda 4B spectrophotometer with 10 millimeter (mm) glass cuvettes. The TBA result content is calculated and recorded in a table and illustrated in a bar graph, see Table I and FIG. 10 below.

Next, a 350 ml sample of Sample B Oil is placed in the food treating apparatus of the present invention, e.g., the same stainless steel pot described above configured with the handle 18''' illustrated in FIG. 6. The sample of Sample B Oil is heated to a temperature of about 185° C. The temperature of the sample of the Sample B Oil is maintained at about 185° C. for approximately 2 to 3 minutes (without french fries). Next, 120 grams of frozen french fries are introduced into the food treating apparatus of the present invention at the set temperature and fried for about 5 minutes. The temperature is closely monitored to maintain the temperature within about ±5° C. using a temperature control and a thermocouple.

After frying, the french fries are removed from the sample of the Sample B Oil and placed on trays with paper towels to cool to room temperature. Then, the sample of Sample B Oil is allowed to cool to room temperature. Next, several 125 mg samples of the sample of Sample B Oil are measured out and placed in separate glass vials. Next, each of the 125 mg samples of Sample B Oil is mixed separately with 25 ml of 1-butanol to form a solution. Afterwards, 5 ml of the Sample B Oil and 1-butanol solution from each glass vial is mixed separately with 5 ml of a TBA reagent solution and placed in separate test tubes. The test tubes are closed and placed in a thermostated bath at about 95° C. for approximately 120 minutes. After approximately 120 minutes, the test tubes are removed and cooled under running tap water for about 10 minutes. An absorbance spectra in a range of 190–900 nm is recorded for each of the solutions contained in the test tubes using a Perkin Elmer Lambda 4B spectrophotometer with 10 millimeter (mm) glass cuvettes. The TBA result content is calculated and recorded in a table and illustrated in a bar graph, see Table I below and FIG. 10.

TABLE I

TBA Analysis of Sample A Oil and Sample B Oil

| Sample | Sample A Oil | Sample B Oil |
| --- | --- | --- |
| Units: milligrams of malonaldehyde per kilogram of sample | | |
| Reference Oil | 0.0325 | 0.0051 |
| Present Invention Cooked | 0.0369 | 0.0093 |
| Conventional Cooked | 0.0459 | 0.0230 |

FIG. 10 shows bar charts showing TBA result content in Sample A Oil and Sample B Oil. The first bar shows the TBA result content of a reference sample of each oil. The second bar shows the TBA result content for the sample oil cooked in the food treating apparatus of the present invention. The third bar shows the TBA result content for the sample oil cooked in the conventional cooking apparatus. Table I and FIG. 10 show explicitly that there is a reduction in oil oxidation for oil samples heated in the food treating apparatus of the present invention versus oil samples heated in a conventional cooking apparatus.

It should be understood by those having ordinary skill in the art that one should not come to the conclusion that one oil is performing better than the other due to the difference in reference oils. That is, the change in TBA result content for oil cooked in the conventional cooking apparatus and the food treating apparatus of the present invention with respect to the TBA result content for the reference oil from the same sample oil may be compared, but a comparison between the TBA result content of the different sample oils should not. Significant reduction in oil oxidation is observed in oils cooked with the food treating apparatus of the present invention as compared with oils cooked in the conventional cooking apparatus.

After the french fries reach ambient temperature, approximately 10 french fries, 5 to 8 cm long, from each cooking process described above, are placed into separate glass vials. The glass vials with the french fries are placed in a freezer until the LC/MS/MS test is conducted. Next, the LC/MS/MS test is conducted to determine the acrylamide content in the french fries. The amount of acrylamide determined by the LC/MS/MS test is recorded in Table II below and illustrated in a bar graph in FIG. 11. The amount of acrylamide is recorded in ppb of the sample of food, i.e., the french fries.

TABLE II

LC/MS/MS Measurement of Acrylamide in French Fries

| Sample | Acrylamide Concentration (ppb) |
| --- | --- |
| French Fries - Sample A - Present Invention | 613 |
| French Fries - Sample A - Conventional Cooking | 1482 |
| French Fries - Sample B - Present Invention | 2104 |
| French Fries - Sample B - Conventional Cooking | 6486 |

Figure 11:
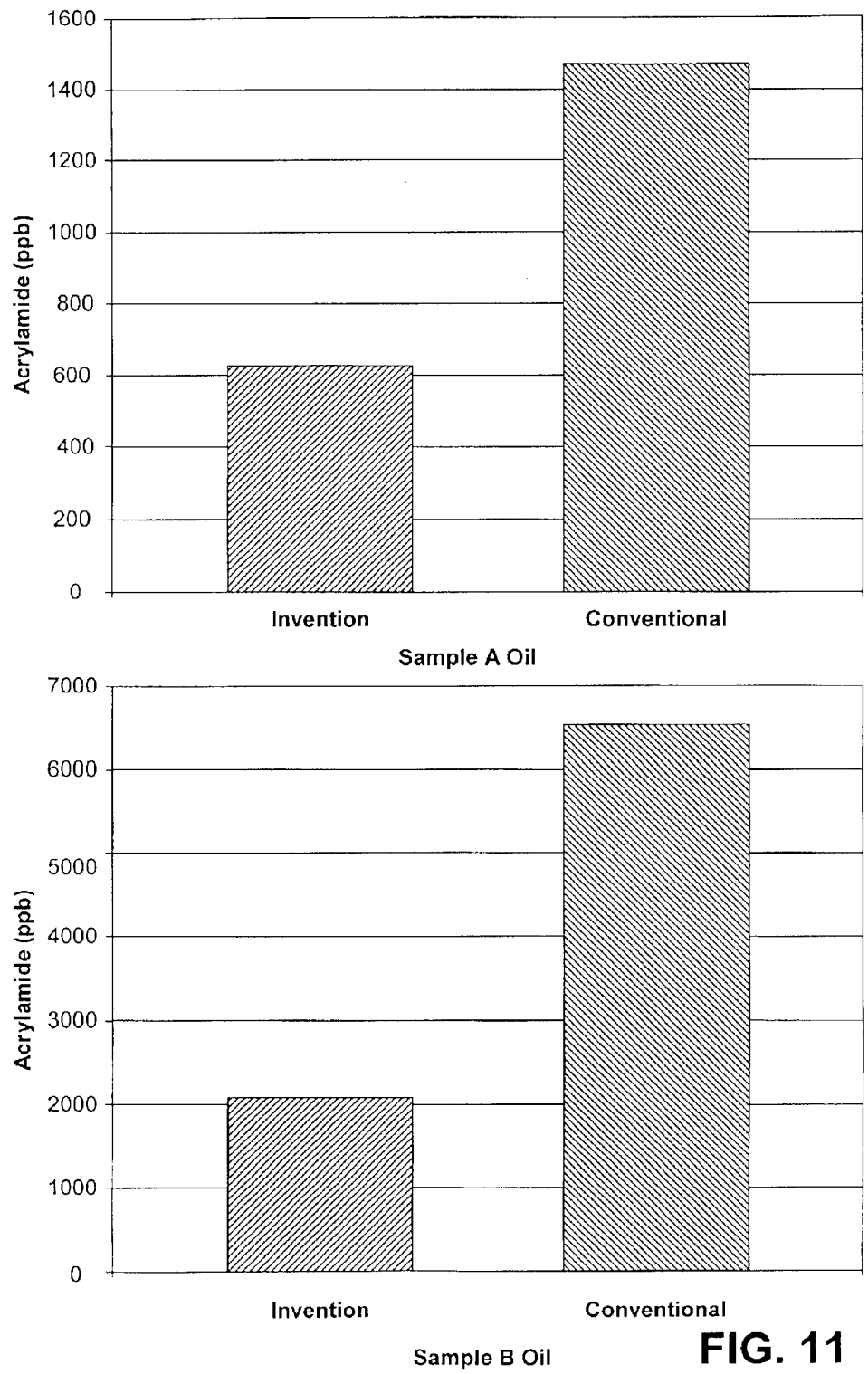
FIG. 11 presents bar charts showing acrylamide content in parts per billion (ppb) in french fries cooked in oil of Sample A Oil and Sample B Oil. The french fries are cooked in a food treating apparatus of the present invention and a conventional cooking apparatus in each sample oil.

FIG. 11 shows bar charts showing acrylamide content in french fries cooked in Sample A Oil and Sample B Oil in the food treating apparatus of the present invention and the conventional cooking apparatus. In both cases, cooking with the food treating apparatus of the present invention showed significant reduction in acrylamide content in french fries. Once again, comparison should not be made between the different kinds of oil due to the differences in the starting reference oil.

Preliminary results show that frying with the food treating apparatus of the present invention significantly reduces the acrylamide content in french fries for both Sample A Oil and Sample B Oil. Furthermore, although not wishing to be bound to any one theory, preliminary results indicate that there is a direct correlation between a reduction in oil oxidation yields and a reduction in the amount of acrylamide present in french fries. The greater the reduction of oxidized species the lower the amount of acrylamide.

Figure 12:
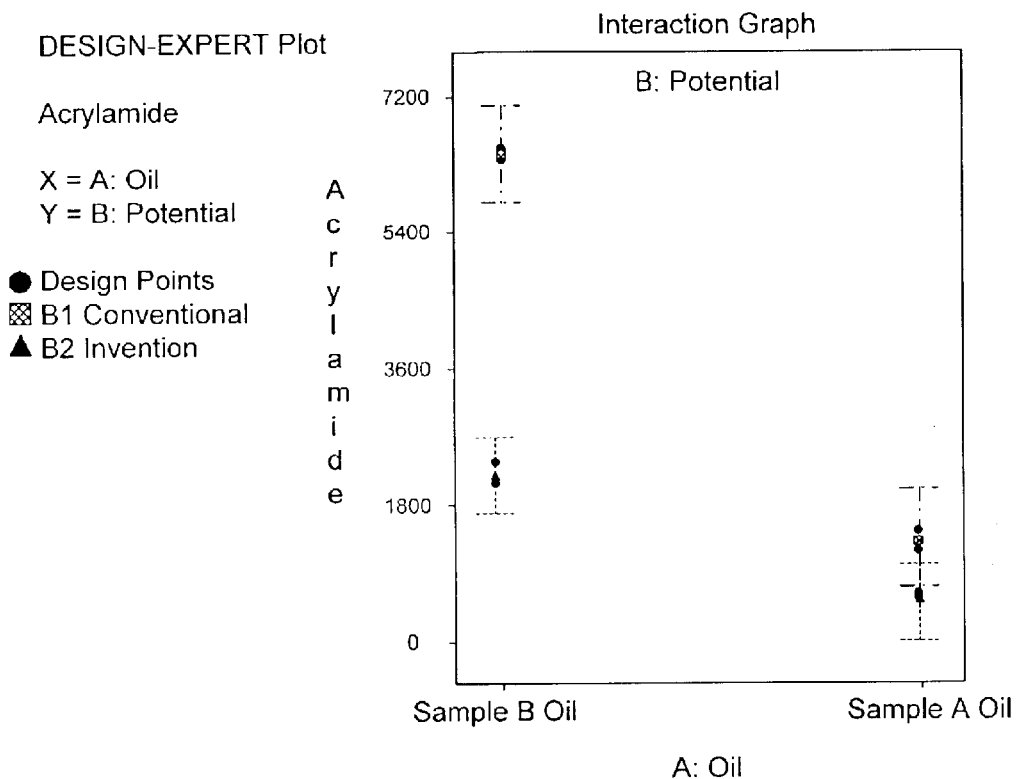
FIG. 12 presents an interaction graph comparing the effect on acrylamide content (in ppb) in french fries cooked in oil of Sample A Oil and Sample B Oil. The french fries are cooked in a food treating apparatus of the present invention and a conventional cooking apparatus in each sample oil.

Additionally, a statistical analysis is performed using Stat-Ease Design-Expert software. This software is used to determine whether there is a relationship between respective parameters, such as the ones listed below. The existence of a relationship would be indicative that by varying one parameter, the other would tend to vary according to that relationship. The experiment is designed as a General factorial experiment with two (2) parameters: $1^{st}$ parameter, Sample A Oil versus Sample B Oil and $2^{nd}$ parameter, food treating apparatus of the present invention versus conventional cooking apparatus. Each test measurement is replicated and one block is assigned per replicate. Both parameters are shown to be significant. FIG. 12 shows a resulting interaction graph while Table III shows ANOVA results.

TABLE III

ANOVA (Analysis of Variance for Selected Factorial Model)
Response: Acrylamide (ppb)

| Source | Sum of Squares | DF | Mean Square | F Value | Prob > F | |
|---|---|---|---|---|---|---|
| Block | 2.91E+006 | 1 | 2.916E+006 | | | |
| Model | 2/224E+007 | 3 | 7.412E+006 | 146/21 | 0.0068 | Significant |
| A (Oil) | 1.750E+007 | 1 | 1.750E+007 | 345.23 | 0.0029 | |
| B (Present Invention or Conventional) | 9.206E+006 | 1 | 9.206E+006 | 181.59 | 0.0055 | |
| AB | 4.522E+006 | 1 | 4.522E+006 | 89.20 | 0.0110 | |
| Residual | 1.014E+005 | 2 | 50696.17 | | | |
| Cor Total | 2.525E+007 | 6 | | | | |

The model F-value of 146.21 implies the model is significant. There is only a 0.68% chance that a "Model F-Value" this large could occur due to noise.

Values of "Prob>F" less than 0.0500 indicate model terms are significant. In this case, A, B and AB are significant model terms. Values greater than 0.1000 indicate the model terms are not significant.

| Std. Dev. | 225.16 | R-Squared | 0.9955 |
|---|---|---|---|
| Mean | 2112.29 | Adj R-Squared | 0.9887 |
| C.V. | 10.66 | Pred R-Squared | N/A |
| PRESS | N/A | Adeq Precision | 31.141 |

"Adeq Precision" measures the signal to noise ratio. A ratio greater than 4 is desirable. A ratio of 31.141 indicates an adequate signal. Thus, the model can be used to navigate the design space.

Thus, the examples support the following three (3) observations:

1. Significant reduction in oil oxidation is observed in TBA tests in samples cooked with the food treating apparatus of the present invention as compared with conventionally cooked samples.
2. A lighter yellow color is observed in samples cooked with the food treating apparatus of the present invention versus samples cooked in a conventional method (darker yellow). This result is not quantitative, but only qualitatively supports findings from TBA testing.
3. The acrylamide content in french fries determined by using the LC/MS/MS method shows preliminary results that the food treating apparatus of the present invention significantly reduces the acrylamide content in french fries in both Sample A Oil and Sample B Oil. Based on the preliminary results, it appears that reduced oil oxidation was beneficial to the reduction of acrylamides in fried foods, e.g., french fries.

Figure 13:
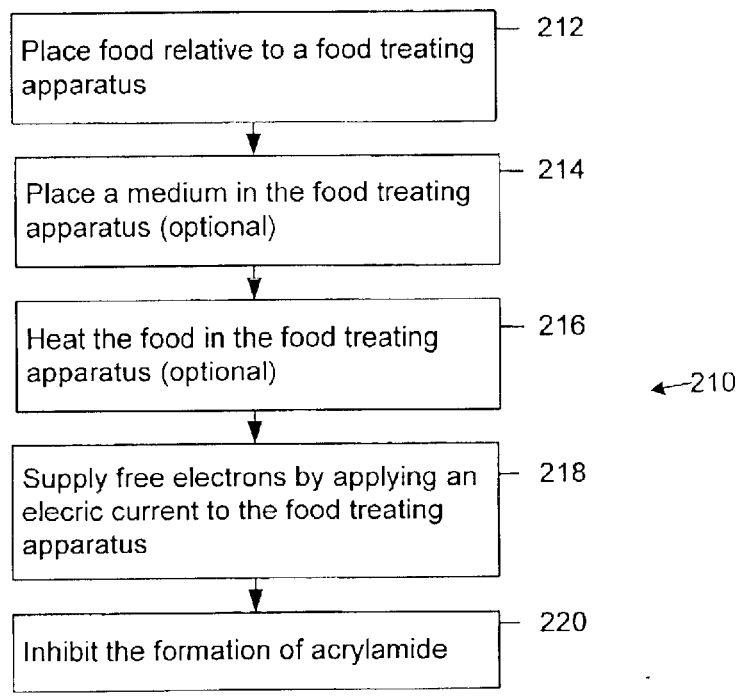
FIG. 13 is a flow chart highlighting steps of a food treating process.

The steps of a method 210 for treating food material 112 is outlined in the flow chart shown in FIG. 13. Although the flow chart of FIG. 13 shows a specific order of execution, it is understood that the order of execution may differ from that which is depicted. For example, the order of execution of two or more blocks may be scrambled relative to the order shown. Also, two or more blocks shown in succession in FIG. 13 may be executed concurrently or with partial concurrence. It is understood that all such variations are within the scope of the present invention. Additionally, the food treating apparatus may be any of the food treating apparatuses described herein, a utensil, for example, a wire mesh basket, in which the food material 112 is placed, a skewer for fastening meat or vegetables to in order to keep the meat and vegetables in form while roasting or broiling, a grill solid or otherwise on which food is placed, etc. For exemplary purposes, the method will be described in relation to the food treating apparatus described in relation to FIGS. 7 and 8 above.

In Step 212, the food material 112 is placed relative to a food treating apparatus 100. That is, the food material 112 may be placed on a surface 140 of the vessel 114 of the food treating apparatus 100.

In Step 214, the medium 116 is placed in the vessel 114 of the food treating apparatus 100. The medium 116, organic or inorganic, may be an oxidizing medium, for example, water, sauce, oil, fat, or other medium used in a boiling, cooling, warming, steaming, basting, skewering, sauteing, baking, roasting, frying or deep frying process or other cooking, storing, cooling, preparing or treating process. For exemplary purposes, the medium 116 is oil. The use of the medium 116 may be optional.

In Step 216, the food material 112 placed relative to the food treating apparatus 100 is heated. The food material 112 may be heated by an electrical current, microwave energy, or the like. Alternatively, an external heat source such as a flame, an electrical heat source or the like, may be used to heat the food treating apparatus 100.

It should be understood that the order of the steps may be conducted in an various orders. For example, the food material 112 may be placed in the food treating apparatus 100 after the medium 116 has been placed in the food treating apparatus 100. Alternatively, if an external source is used to heat the food treating apparatus, the external source may heat the food treating apparatus 100 prior to the placement of the medium 116 in the food treating apparatus 100 and the placement of the food material 112 in the medium 116. Alternatively, the food treating apparatus 100 may be heated and the food material 112 placed therein followed by the introduction of the medium 116. Heating the food material 112 is an optional step.

In Step 218, excess electrons 138 are supplied to the food material 112. The excess electrons 138 may be supplied to the surface 140 of the vessel 114 of the food treating apparatus 100 via the electric current applied to the food treating apparatus 100 by the electric circuit 135.

In Step 220, the excess electrons 138 inhibit the formation of acrylamide. The excess electrons 138 are absorbed by the food material 112. The excess electrons 138 absorbed by the food material 112 may inhibit a chemical reaction which results in the production of acrylamide, for example, the excess electrons 138 may prevent the chemical reaction between amino acids found in the food material 112, for example, potatoes and cereals as described above, from reacting with sugar, such as glucose. Additionally or alternatively, the excess electrons 138 suspended in the medium 116 may inhibit the formation of acrylamide by inhibiting and/or reducing the oxidation of the medium 116.

In other words, the formation of acrylamide in food, e.g., french fries, may be inhibited and/or reduced by the absorption of free electrons by a food material either through direct contact with a surface containing free electrons or free electrons suspended in a medium contained in a vessel 14. Further, the excess electrons my inhibit the formation of acrylamide by altering the chemical reactions of the amino acids and the sugars in the food material in a medium used in a cooking process.

While the invention has been described in conjunction with exemplary embodiments herein, it is evident that many equivalents, alternatives, modifications and variations will be apparent to those skilled in the art in light of the foregoing description. For example, in another embodiment, a current source to the anode 122 and the vessel 114 may be provided by a solar cell (not shown) mounted integrally upon the housing 149 of the electron source 118 as described above, in relationship to FIG. 6. Accordingly it is intended to embrace all such equivalents, alternatives, modifications and variations within the spirit and scope of the appended claims.

We claim:

1. The food treating apparatus, comprising:

a vessel;

an electron source electrically coupled to the vessel; and an electric circuit for providing electrons to a food, wherein at least part of the electric circuit is integral with the electron source and is operative to provide electrons to the food in the vessel to inhibit the formation of acrylamide in the food, wherein the electric circuit includes:

an anode;

a cathode; and a resistive element and wherein the cathode and anode are cooperative to provide electrons by an electrochemical process, and wherein a reducing housing electrically couples the electron source to the vessel to provide a path for the electrons from the electron source to the vessel.

2. The food treating apparatus according to claim 1, wherein the reducing housing is configured to circulate a medium-placed in the vessel through the housing and back to the vessel, the electrons are supplied to the medium as the medium is circulated through the housing.

3. The food treating apparatus according to claim 2, wherein the reducing housing is a filter housing including a filter for removing unwanted particles from the medium.

4. The food treating apparatus according to claim 3, wherein the electron source is electrically coupled to the filter to provide electrons to the filter for supplying electrons to the medium.

5. A food treating apparatus, comprising:

a vessel;

an electron source electrically coupled to the vessel; and an electric circuit for providing electrons to a food, wherein at least part of the electric circuit is integral with the electron source and is operative to provide electrons to the food in the vessel to inhibit the formation of acrylamide in the food, wherein the vessel is a wire mesh basket.

* * * * *